Jan. 23, 1945. J. DUSEVOIR 2,367,850
METHOD OF MACHINING CURVED SERRATIONS IN FLAT SURFACES
Filed Dec. 24, 1941 2 Sheets-Sheet 1
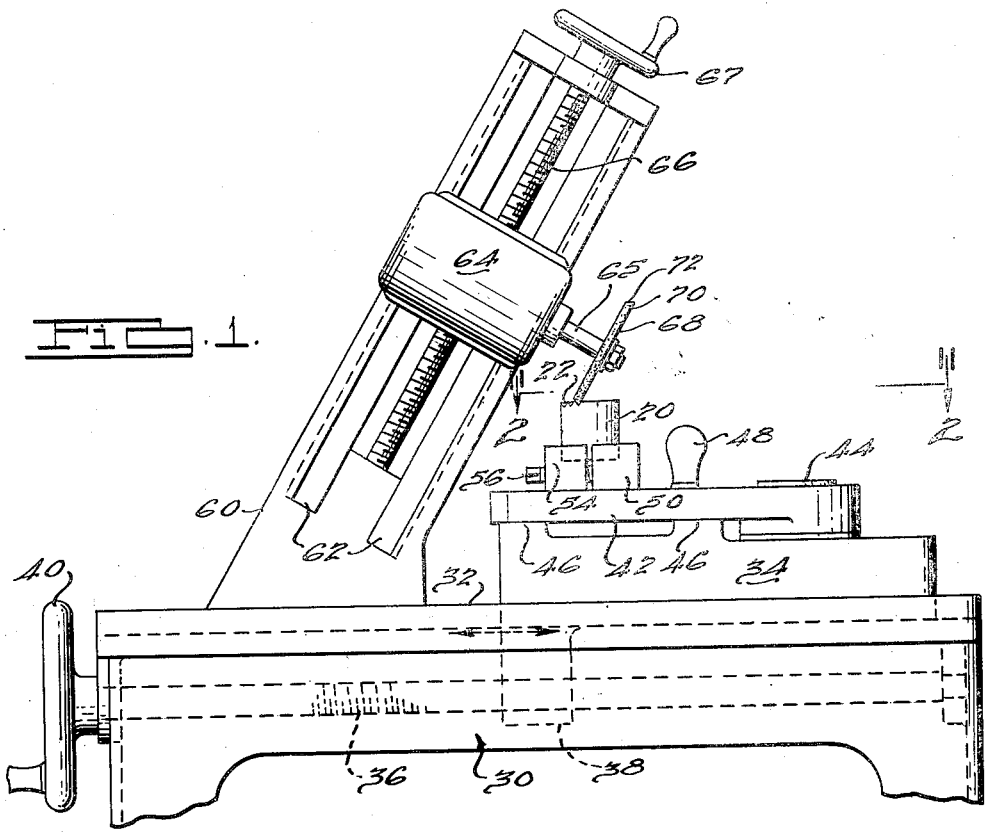
INVENTOR
*Julius Dusevoir.*
BY *Harness, Dickey & Pierce.*
ATTORNEYS.

Jan. 23, 1945. J. DUSEVOIR 2,367,850
METHOD OF MACHINING CURVED SERRATIONS IN FLAT SURFACES
Filed Dec. 24, 1941 2 Sheets-Sheet 2
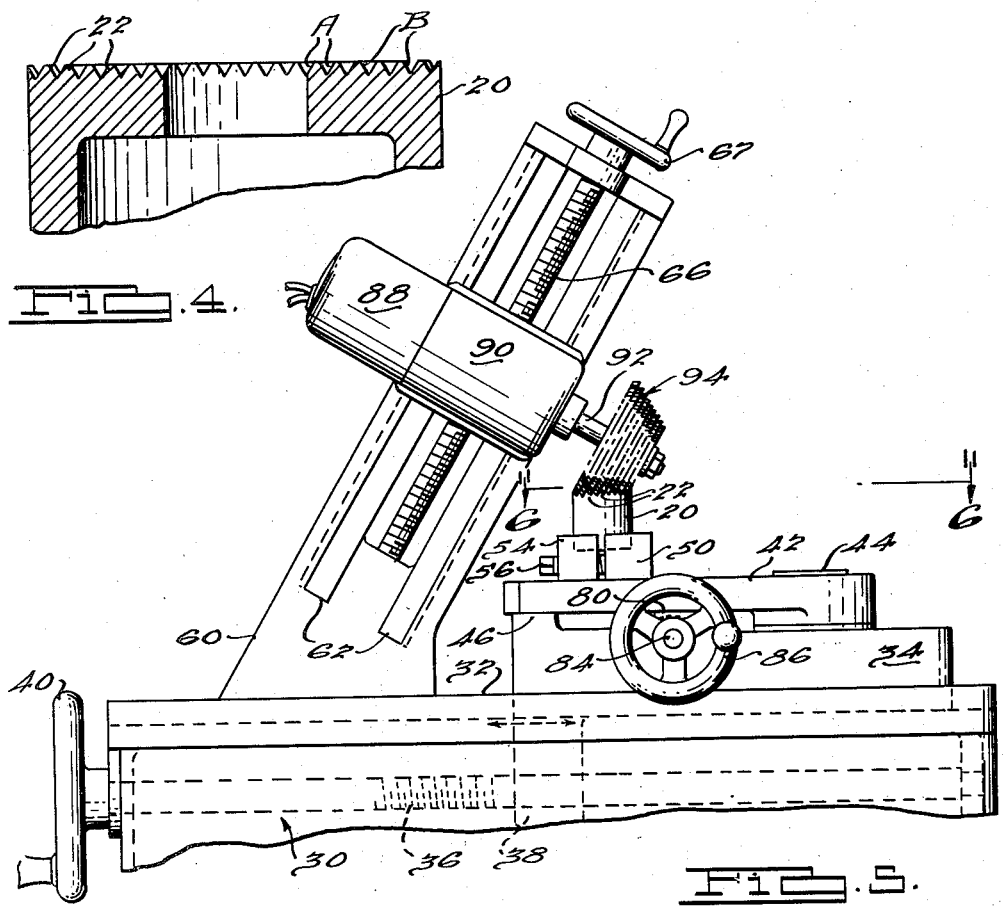
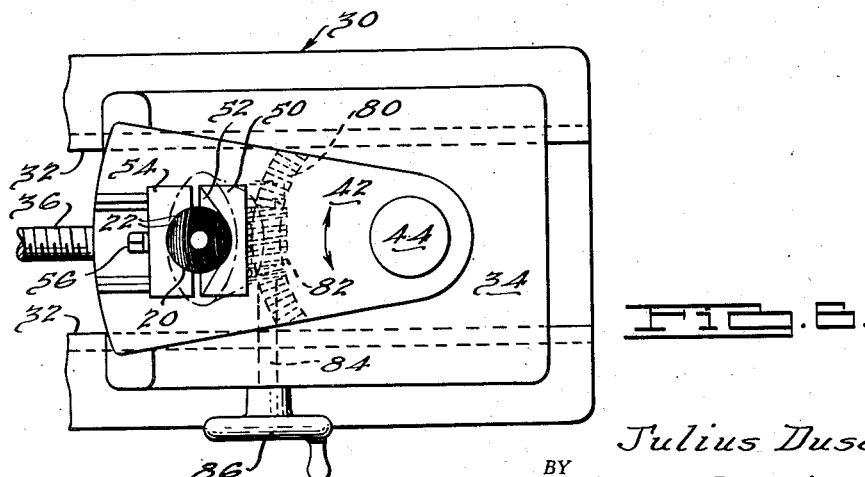
INVENTOR
Julius Dusevoir.
BY
ATTORNEYS.

Patented Jan. 23, 1945

2,367,850

UNITED STATES PATENT OFFICE 2,367,850

METHOD OF MACHINING CURVED SERRATIONS IN FLAT SURFACES

Julius Dusevoir, Dearborn, Mich., assignor to Century Motors Corporation, Dearborn, Mich., a corporation of Michigan Application December 24, 1941, Serial No. 424,266

3 Claims. (Cl. 51—281)

This invention relates to a method of machining curved serrations in flat surfaces by means of a rotating cutting tool and has for its principal object the provision of a method by means of which such serrations may be so machined to a high degree of accuracy and in a simple and economical manner.

Objects of the invention include the provision of a method of machining curved serrations having angularly disposed side faces in a flat surface of a piece of work by means of a rotating cutting tool, comprising arranging the cutting tool for rotation with its axis of rotation arranged perpendicular to a plane arranged in tangent relation with respect to the radially outer surface of the serration or serrations to be formed and causing a relative bodily shiftable movement between the cutting tool and the work to cause relative movement of the cutting element in a curved path with respect to the face of the work; the provision of a method as above described in which the cutting element is arranged with cutting faces or edges of a cross-sectional contour complementary to the cross-sectional contour of the serrations desired on the work; the provision of a method as above described in which the cutting element is bodily shiftable in a direction perpendicular to its axis of rotation toward and from the surface of the work to be serrated thereby; and the provision of a method of machining curved serrations in a flat face of a piece of work by engagement with the periphery of a rotatable cutting element without interference between the cutting element and the work.

The above being among the objects of the present invention the same consists in certain novel steps and combinations of steps of operation to be hereinafter described with reference to the accompanying drawings, and then claimed, having the above and other objects in view.

In the accompanying drawings which illustrate suitable embodiments of apparatus by means of which the method of the present invention may be carried out, and in which like numerals refer to like parts throughout the several different views, Fig. 1 is a side elevational view of an apparatus satisfactory for employment with the method of the present invention for the purpose of grinding serrations in the surface of a piece of work;

Fig. 2 is a fragmentary plan view of the apparatus shown in Fig. 1 taken as looking on the line 2—2 thereof;

Fig. 3 is a view of the serrated face of the piece of work which has been serrated by the mechanism illustrated in the drawings;

Fig. 4 is an enlarged fragmentary, transverse sectional view taken on the line 4—4 of Fig. 3;

Fig. 5 is a view similar to Fig. 1 but illustrating a modified form of mechanism by means of which a milling cutter may be used in place of the grinding wheel employed in the apparatus shown in Fig. 1; and, Fig. 6 is a fragmentary plan view of the apparatus shown in Fig. 5 taken as on the line 6—6 thereof.

The method of the present invention is applicable for use in arcuately serrating the surface of a part which is adapted to be arranged in abutting relation with respect to a complementarily serrated surface of another part intended to be connected thereto. The interfitting curved serrations of the two faces in such case serve as a means for preventing relative displacement between the two parts in the plane of their mating faces except in the direction of the length of the serrations themselves. Broadly speaking, such serrated connections may be employed between any two members having abutting faces regardless of the character or construction of the members. However, one such use is in the connection between the various separately formed parts of a built-up crankshaft such as shown and claimed in my United States Letters Patent No. 2,013,039, issued September 3, 1935. Where such serrated connections are to be employed between the various elements of a built-up machine part, such as the crankshaft disclosed in my United States Letters Patent above identified, it is essential in obtaining the desired final result that the serrations on opposed faces of such elements be accurately formed, and where one or more of the elements are to be interchangeable with other similarly formed elements it will be appreciated that a uniformity of size, contour and location of such serrations is necessary in order to obtain the desired result. Such serrations having side faces disposed at an angle with respect to each other and to the face of the work on which they are formed are preferably of more or less triangular cross-sectional configuration with the two sides of the serrations arranged at equal angles to the plane of the face upon which they are formed. This is the type of serration that is shown and described herein, but those skilled in the art will appreciate that the present invention is applicable to the forming of serrations of almost any cross-sectional configuration as long as the radially outer face thereof is inclined toward the axis of curvature thereof.

In some cases parts having such serrated faces are hardened by suitable heating and quenching operations after the serrations have been formed thereon and such pieces are liable to warpage or distortion in such hardening operation, requiring the serrated faces to thereafter be ground to bring them to their desired state of final accuracy. Where such workpiece is of a character initially too hard to machine by an ordinary cutting tool, then the only way such serrations may be formed thereon is by a grinding wheel. In either case the problem involved in the grinding operation is substantially the same.

When straight serrations of the type under consideration are ground in a flat surface the axis of rotation of the grinding wheel is conventionally arranged in parallelism to such surface, the periphery of the wheel is dressed to a shape complementary to the shape of the serrations desired on the work, and the grinding wheel and work are moved relative to one another in a straight line with the grinding wheel in engagement with the surface of the work to be serrated. It will be appreciated by those skilled in the art that if a similarly arranged grinding wheel, that is one arranged with its axis parallel to the surface of the work which is to be serrated, is dressed so that its peripheral cross-sectional configuration is complementary to the cross-sectional configuration between the pair of serrations to be formed on a piece of work, and the wheel and the work are caused to move relatively with respect to each other to cause the wheel to engage the work along a curved path, unless the serrations have a relatively large radius of curvature and the wheel is of an extremely small diameter and too small to be utilized commercially, interference will develop between the wheel and the work which will cut away the radially inner faces of the serrations being formed to an extent which will destroy the desired cross-sectional size, shape and contour of the serrations. The desired cross-sectional size, shape and contour of the serrations may be approached but not fully met by dressing that edge of the grinding wheel which is to form the radially inner face of a serration at an angle, with respect to a plane perpendicular to the face of the work upon which the serrations are being formed and including the plane of thickness of the grinding wheel, less than the actual angle desired for such face of the serrations with respect to the same plane. Dressing a grinding wheel in such manner, however, is undesirable both from the standpoint of not being able to obtain the desired degree of accuracy in the serrations and from the standpoint of requiring a different angularity of the thus dressed off side of the grinding wheel when operating upon serrations of different radii.

The same problems exist when it is attempted to form such serrations by means of an edge cutting type of milling cutter instead of a grinding wheel as will be readily appreciated by those skilled in the art.

Such serrations could be formed by a grinding wheel if the grinding wheel employed is a pencil wheel which is axially pointed at an angle complementary to the angle desired between the adjacent serrations and is moved relatively to the work along the curvature of the desired serrations. Likewise a milling cutter may be used if in the form of an end mill when formed similarly to the pencil grinding wheel above described and similarly used. However, it will be appreciated that in either case the cutting element would require frequent dressing or sharpening and the operation of serrating the face of a piece of work thereby would be a long and tedious job involving an unwarranted amount of expense.

The present invention provides a method by means of which the periphery of a rotating cutting element, such as a grinding wheel, milling cutter or the like, may be formed so that the cross-sectional size, shape and contour of its peripheral portions are exactly complementary to the cross-sectional contour of the serrations desired in the work and may be fed relative to the work along the desired path of curvature of the serrations desired in the work, without interference with the work, so as to quickly and accurately form the desired serrations thereon.

This is accomplished in accordance with the present invention by mounting the rotatable cutting element and the work for relative movement with respect to each other along the desired path of curvaure of the serrations and arranging the axis of rotation of the cutting element perpendicular to a plane tangent to the radially outer surface of a serration to be formed thereby. The cutting element and work are preferably arranged for relative feeding movement one toward the other and while this movement may occur in a direction perpendicular to the face of the work upon which the serrations are to be formed it is preferably in a direction parallel to the same plane which is tangent to the radially outer surface of a serration to be formed on the work. With such arrangement it will be appreciated that one face of the cutting element which is to operate upon the radially outer surface of a serration to be formed will be perpendicular to the axis of rotation of the cutting element while the remaining face will be disposed at an angle thereto, when viewed in section taken radially of the axis of rotation of the cutting element, exactly equal to the angle between the adjacent faces of two adjacent serrations to be formed thereby. It will be appreciated that in such case a grinding wheel may be employed having a peripheral curvature equal to or less than the curvature of the serrations to be formed and as viewed in a direction perpendicular in a plane tangent to the radially outer face of such serrations, without causing any interference whatever between the cutting element and the work.

The cutting element may be formed to machine more than one serration at a time and in such case the general contour of the cutting element will be that of a truncated cone having a peripherally serrated outer surface. While such multiple edged cutting element may be either a grinding wheel or a milling cutter, because of the possible difficulty of dressing a grinding wheel to provide such multiple cutting edges it is possible that from a commercial standpoint at least such multiple edged cutting tool will be limited in practice to cutting elements of the milling cutter type.

While a piece of work which may be serrated in accordance with the present invention may be formed of any suitable material and may be of any size, shape and contour as long as it is provided with a flat face upon which the serrations are to be formed, for the purpose of illustration in the accompanying drawing the work 20 is illustrated in the form of a short cylinder which may be assumed to be formed of steel, and having flat axial end faces arranged in plane perpendicular to the axis thereof and upon the upper of which end faces serrations are to be formed. As illustrated in Figs. 3 and 4 which show one end of the piece of work 20 in finished serrated condition the serrations 22 thus formed on the end face of the work 20 are of curved character all struck about a common point located outside, to the right as viewed in Fig. 3, beyond the outer periphery of the work and are, therefore, of arcuate shape and concentric to each other. All of the serrations 22 are of the same cross-sectional configuration and the cross-sectional sizes of all of the serrations are identical to each other. As illustrated in Fig. 4 the serrations 22 have straight side faces and are of generally triangular cross-sectional configuration with both side faces arranged at the same angle with respect to a plane perpendicular to the plane of the end face of the work 20 upon which the serrations are formed. Although the serrations 22 may be brought to a sharp point it will usually be desirable, for practical purposes, that such points be eliminated and the serrations be provided with a relatively narrow flat outer edge portions as best illustrated in Fig. 4. For the purposes of description herein that surface of each serration, illustrated as the surfaces A in Fig. 4, positioned more remote from the center of curvature of such serrations will be referred to as the radially outer surface of the serration, and that surface B of each serration more adjacent the center of curvature of the serrations will be referred to as the radially inner surfaces of the serration. However, insofar as the groove between adjacent serrations or teeth is concerned, A designates the inner side of a given groove and B the outer side of said groove, said inner side being inclined away from the work toward a perpendicular line passing through the axis of the pin 44.

Referring now to Figs. 1 and 2 which illustrate a suitable form of apparatus which may be employed in carrying out the method of the present invention where the rotatable cutting element is a grinding wheel, the apparatus there shown comprises a bed 30 having a pair of spaced, parallel horizontal ways 32 on its upper surface and upon which a table 34 is received and guided for longitudinal sliding movement in a conventional manner. Such movement may be controlled by means of a screw 36 engaging a nut 38 fixed with respect to the table 34, the screw 36 being operated by any suitable means such as the hand wheel 40 and being held against axial movement relative to the bed 30, all in a conventional manner. The table 34 is provided on its upper surface with a supporting member 42 which is pivoted thereto by means of the vertically extending pin 44 for sliding movement over the upper face of the table 34 about the axis of the pin 44. Preferably the table 34 is provided with a pair of spaced ways 46 upon which the work supporting member 42 rests and which, therefore, serve to maintain the horizontal position of the work supporting member 42 in its oscillating movements about the axis of the pin 44 during a cutting operation as will be hereinafter more fully described. Any suitable means, either power driven or manual, may be provided for oscillating the work supporting member 42 about the axis of the pin 44, such means being illustrated in the present case more or less diagrammatically as a handle 48 secured to the work supporting member 42 and projecting upwardly therefrom, whereby a workman may grasp the same and manually effect oscillating movement of the work supporting member 42.

In order to support the workpiece 20 upon the work supporting member 42 a member 50, the upper portion of which as particularly brought out in Fig. 2 is formed to provide a V-block and an associated horizontal surface 52 for locating the work 20 vertically with respect thereto, is fixed to the supper surface of the work supporting member 42. A cooperating clamping member 54 movable towards and from the member 50 by means of a screw 56 is arranged in cooperating relation with respect to the member 50. The work 20 is received within the V-block portion of the member 50 and is seated upon the surface 52 thereof, and the member 54 is drawn up by the screw 56 to clamp the work in position between the members 54 and 50 as indicated. The work 20 is, of course, in such case arranged with its axis vertical and its upper axial face, therefore, horizontal. The position of the member 50 is, of course, so related with respect to the axis of rotation of the pin 44 that a cutting element engaging the upper face of the work will produce serrations 22 of the desired curvature.

Fixed to the bed 30 to the left of the table 34 as view in Fig. 1 and extending upwardly therefrom is a pillar 60 provided with a pair of parallel ways 62 on the near face thereof as viewed in Fig. 1. While the pillar 60 and ways 62 may be arranged at any suitable angle with respect to a horizontal plane, from a vertical position to a position equal in angularity to the faces of the serrations 22, they are preferably arranged at the same angle with respect to a horizontal plane as the radially outer faces A of the serrations 22 desired to be formed in the upper surface of the workpiece 20 and this is the relation shown. Slidably supported on the ways 62 for movement longitudinally thereof is an electric motor driving unit indicated generally at 64 having a rotatable spindle 65, the spindle being arranged with its axis of rotation parallel to the outer faces of the ways 62 and perpendicular to the length of the ways 62. The unit 64 is adjustably controlled in its position on the ways 62 by means of a screw 66 rotatably mounted against axial movement in the pillar 60 and rotatably controlled by means of a hand wheel 67. On its righthand end the spindle 65 supports a rotatable cutting element here shown in the form of a disc-like grinding wheel 68. The grinding wheel 68 is, therefore, arranged for rotation about an axis which is perpendicular to a plane tangent to the radially outer surface of a serration to be formed upon the upper face for the workpiece 20 and the general plane of thickness of the wheel 58, therefore, lies in or parallel to such tangent plane.

In the broader aspects of the invention the grinding wheel 68 may be peripherally formed to operate upon the piece of work 20 to remove metal therefrom between more than two pairs of serrations to be formed thereupon, but for the purpose of simplicity in description the particular grinding wheel 68 shown is formed to remove metal from the end surface of the piece of work 20 only between two adjacent serrations to be formed thereon in any one setting between the grinding wheel and work. Accordingly, it will be appreciated that the outer or righthand face of the grinding wheel 68, as viewed in Fig. 1, or at least the outer peripheral marginal portion 70 of such face, is dressed off in a plane perpendicular to the axis of rotation of the grinding wheel, such plane being a plane which will be tangent to the radially outer surface A of one of the serrations to be formed thereby. The peripheral edge 72 of the grinding wheel 68 is dressed off at an angle to the above mentioned face thereof such that the cross-sectional configuration of the periphery of the grinding wheel, as viewed in a plane including the axis of rotation thereof, will exactly conform to the cross-sectional configuration desired between a pair of serrations to be formed on the work. Such angle will, of course, be the same angle as that between the radially inner and outer faces of the serrations themselves. Thus where the opposite faces of the serrations 22 are disposed at an angle of, for instance, 60 degrees with respect to each other, the angle between the surfaces 70 and 72 of the wheel 68 will also be 60 degrees. In the particular case shown and considering the angle between the faces A and B of the serrations 22 to be 60 degrees, as a matter of illustration, and both faces disposed at the same angle with respect to a plane perpendicular to the end face of the workpiece 20 and centrally intersecting a section of a serration, the plane of the surface 70 of the grinding wheel 68 will be disposed at an angle of 30 degrees to a plane perpendicular to the upper end face of the work 20. Stated differently, a line lying in the end surface 72 of the wheel 68 and in a plane including the axis of rotation of the wheel 68 will be disposed at an angle of 60 degrees with respect to an intersecting line lying in the plane of the edge 70 and including the axis of rotation of the wheel 68.

The same relative arrangement of parts will, of course, obtain regardless of the angle between the opposite faces A and B of any serration 22 as long as all the serrations are of the same cross-sectional configuration. It is to be noted, however, that the practices of the present invention require that the serrations 22 have the inner side face B thereof disposed at an angle materially less than 90 degrees to the plane of the surface on which it is formed and inclined away from such surface towards the axis of oscillation of the work.

In employing the above described apparatus to serrate the upper end face of the piece of work, the hand wheels 40 and 67 are first operated to bring the work 20 and the grinding wheel 68 into operative relation with respect to each other. As previously explained the grinding wheel 68 may be employed to finish grind serrations which have been previously formed in a piece of work and after which the work has been heated and quenched to harden it and, therefore, requires re-grinding to offset the effect of any warpage or distortion that may have occurred in the work and serrations because of the hardening operation, or the work may be of hardened character such that the serrations must be formed therein by a grinding operation. This last condition may be assumed in the present case. In such case after the work 20 and grinding wheel 68 have been adjusted relative to one another to bring the operative edge of the grinding wheel into the position in which the first serration is desired to be formed in the work, the hand wheel 67 is operated to move the grinding wheel 68 into a cutting position with respect to the work, and the work support 42 with the work 20 mounted therein is caused to move in an oscillatory path about the axis of the pin 44 by a workman who simply grasps the handle 48 and causes oscillation of the work support 42. Such oscillation is continuously repeated to pass the work back and forth under the grinding wheel 68 and during such repeated oscillation the hand wheel 67 is operated to feed the grinding wheel 68 downwardly on the ways 62 until eventually the grinding wheel 68 has cut into the upper surface of the work 20 to the desired extent, upon which the hand wheel is turned to back off the grinding wheel 68 from the work. The hand wheel 40 is then rotated to move or index the table 34 and consequently the work support 42 and the work 20 supported thereon, to the position in which the next groove is to be cut in the upper surface of the work, and the above described operations are repeated, and such sequence of operations is repeated as many times as is necessary to completely serrate the face of the work being operated upon.

It will, of course, be appreciated that ordinarily it will be necessary to dress the grinding wheel 68 numerous times during the serration of a surface of a piece of work, particularly if the piece of work is formed from a hard material such as hardened steel requiring the entire forming of the serrations to be effected by grinding. It will also be appreciated that in dressing the grinding wheel 68 the edge 72 is the only surface thereof that will require such dressing and consequently the dressing operation will not require re-establishing the indexed position of the table 34 and will not interfere with indexing the table 34 a predetermined amount in shifting the work relative to the grinding wheel to bring the grinding wheel from a position between one pair of serrations to a position between the next adjacent pair of serrations to be formed thereon. The only effect of such dressing operation will be to require the driving unit 64 to be adjusted on the ways 62 in order to permit the wheel 68 to grind the work to the desired depth after such dressing operation.

It will be appreciated that the reason why it is necessary to only dress the face 72 of the grinding wheel 68 when the same requires dressing is that the face 70 of the grinding wheel, in being arranged in parallel relation with respect to the radially outer face of one of the serrations being formed by a grinding operation and in being moved parallel to such face as the wheel is lowered during a grinding operation, removes no metal from the work itself excepting only as the sharp edge of the wheel is worn away during operation and which will, of course, effect such face to only a minor extent.

During such grinding operation as above described, because of the fact that the face 70 of the grinding wheel 68 is tangent to the outer radial side of one of the serrations being formed thereby, such face cannot possibly provide any interference with the work. The only possible interference between the grinding wheel and the work can result through the edge 72 of the grinding wheel. Because of the angular relationship of the axis of rotation of the grinding wheel with respect to the work, the edge 72 in curving both upwardly and laterally away from the point of contact of the wheel with the work provides a relief between the edge 72 of the wheel and the work on each side of such point of contact, and as long as the wheel 68 is of a radius less than the radius of the arc of curvature of the serration being formed and as viewed in a direction perpendicular to a plane parallel with the plane of thickness of the grinding wheel 68, no possible interference between the grinding wheel and the work can result. While the radius of curvature of the serrations 22 thus provides a definite limitation on the diameter of the grinding wheel which is capable of use in forming the serrations in accordance with the method of the present invention, it does permit the use of a grinding wheel of material diameter capable of relatively rapidly removing metal from the work and consequently provides a simple and economical method for forming such serrations in an extremely accurate manner.

The same general method may, of course, be employed where the serrations 22 are to be formed on the work 20 by means of a milling cutter, the principal differences being, of course, that the milling cutter must be rotated at a slower speed than a grinding wheel, that the full depth of the serrations will usually be cut in one pass of the milling cutter, and ordinarily a different means must be provided for effecting a relative feeding movement between the work and the milling cutter than that shown in Figs. 1 and 2. Furthermore, in employing a milling cutter it is practical to form a single cutter or cutter assembly which will simultaneously machine in one pass all of the serrations on the face of the work which is to be serrated. All of this is brought out in Figs. 5 and 6 in which the machine shown is identical in most particulars with the machine shown in Figs. 1 and 2 and, accordingly, in which the same parts are indicated by the same numerals as in Figs. 1 and 2. For this reason it will be necessary only to describe the differences between the construction illustrated in Figs. 5 and 6 to fully explain the entire construction.

Referring now to Figs. 5 and 6 it will be noted that the work 20 is supported in identically the same manner as in the machine illustrated in Figs. 1 and 2 but instead of the workman grasping a handle such as 48 in Figs. 1 and 2 in order to oscillate the work support 42, in the construction illustrated in Figs. 5 and 6 a different and more positive means is provided. While any suitable manually or power operated means may be provided for this purpose, as a matter of illustration the work support 42 is shown as being provided on its under surface with a segment 80 of a worm wheel whose center is concentric with the axis of the pin 44. A worm 82 is mounted upon a shaft 84 supported transversely of the table 34 with the worm 82 in engagement with the worm gear segment 80. The shaft 84 may be rotated manually or by power in any suitable manner but in the particular case shown outwardly of the side of the table 34 it is provided with a hand wheel 86 rotation of which, acting through the shaft 84, worm 82 and worm gear segment 80, serves to effect oscillatory movement of the work support 42 about its pin 44. Thus a more positive feed may be imparted to the work during its engagement with the milling cutter.

An electric motor directly connected to a milling cutter would turn it too fast for practical operation so in this case instead of simply employing an electric motor such as the electric motor 64 in the construction illustrated in Figs. 1 and 2, in this case an electric motor 88 having an associated gear reduction mechanism indicated generally at 90 secured as a unit thereto is mounted upon the ways 62 and is controlled in position longitudinally thereof by means of the screw 66 and hand wheel 67. The tool spindle 92 of the gear reduction mechanism 90 is arranged in identically the same relation with respect to the operative face of the work 20 as the spindle 65 of the electric motor 64 previously described and supports on its outer end a milling cutter indicated generally at 94. Although as previously mentioned the milling cutter 94 may be of a type capable of cutting one groove at a time in the upper face of the workpiece 20, it is practically possible and, therefore, desirable in using a milling cutter to so construct it as to simultaneously mill the grooves between all of the serrations to be formed on the piece of work and such a cutter is illustrated in Fig. 5. Because of the angular relationship between the axis of the spindle 92 and the plane of the work face upon which the serrations are to be formed it will be appreciated that the cutter 94 in such case is more or less of frusto-conical formation as shown and its peripheral surface is circularly serrated and such serrations are formed to provide cutting teeth in a more or less conventional manner. The cutting edges of the teeth of the milling cutter 94, when viewed in a plane passing therethrough and including the axis of rotation of the milling cutter will, of course, be complementary in size, shape and contour to the size, shape and contour of the serrations desired on the work as viewed in a section taken axially through the work. In other words that cutting edge of the teeth of the milling cutter which are to form the radially outer face A of any serration 22 on the work 20 will lie in a plane which is tangent to such outer surface of the serrations while the other cutting edges of the teeth will lie at an angle to the corresponding of the first mentioned cutting edges, and as viewed in a section taken axially through the milling cutter, equal to the angularity between adjacent sides of adjacent serrations 22. The milling cutter 94 in such cases may be made up as a solid member or may be made up as a plurality of disc-like cutters, each of a width corresponding to the width of a serration to be milled in the work, and all secured together in face-to-face relationship for the actual cutting operation.

In employing the milling cutter 94 to serrate the upper end face of the workpiece 20 the hand wheels 67 and 40 may be adjusted to bring the work and the milling cutter into the desired cutting relation with respect to each other and the cutter 94 put into rotation, upon which the hand wheel 86 may be rotated to cause the work to be passed under the milling cutter 94 to effect the desired machining of the upper surface thereof. It will be appreciated that such machining may be done in one operation or in several operations, and in the latter case after each pass of the work under the milling cutter the hand wheel 67 will be operated to move the cutter downwardly to the extent desired for the next succeeding pass. Where the milling operation is to be accomplished in a single pass as will usually be done, then the milling cutter 94 is initially adjusted to a position insuring complete machining of the serrations on the work in one pass, upon which the work is caused to be fed under the cutter for effecting the serrating operation.

As will be readily appreciated the relationship of the milling cutter 94 with respect to the work during a cutting operation is identically the same as the grinding wheel 68 previously described in that by arrangement of parts as described no interference will exist between the cutting elements and the work during the serrating operation unless through mistake a cutting element of excessive diameter is attempted to be employed.

From the above it will be appreciated that by the practices of the present invention rotating cutting elements peripherally shaped into exact complementary relationship with respect to the cross-sectional configuration of the serrations desired on the piece of work may be employed for machining curved serrations on a flat surface of a piece of work in an extremely accurate and efficient manner.

Having thus described my invention what I claim by Letters Patent is:

1. In the formation, by means of a rotating cutting element, of a multiplicity of concentric curved serrations in a flat surface of a piece of work by the formation of a plurality of curved grooves in said surface and in which each groove is provided with a radially inner side inclined away from such surface and from the work toward a perpendicular line passing through the center of curvature of the groove, the steps of mounting said work for bodily shiftable movement about a pivotal axis perpendicular to the plane of said surface, arranging said cutting element with its axis of rotation materially inclined with respect to both the plane of said surface and to a line perpendicular to such plane and passing through the center of curvature of the desired groove, said inclination being such that said axis in extending radially away from said center of curvature also extends away from said surface and work, the periphery of said cutting element having a cross-sectional shape complementary to the cross-sectional configuration desired for the groove, arranging said element with its periphery in intersecting relation to the path of relative movement between said element and work, rotating said cutting element and effecting said relative movement between said cutting element and work until the corresponding groove is formed, then shifting the work and cutting element relative to each other so as to bring said cutting element into position to contact said work on a radius different from that employed for forming the first mentioned groove and rotating said cutting element and again effecting relative movement between said cutting element and work until another of said grooves has been formed, and repeating said relative shifting of said work and cutting element and said relative movement between said cutting element and work until all of said grooves have been formed.

2. In the formation, by means of a rotating cutting element, of a multiplicity of concentric curved serrations in a flat surface of a piece of work by the formation of a plurality of curved grooves in said surface and in which each groove is provided with a radially inner side inclined away from such surface and from the work toward a perpendicular line passing through the center of curvature of the groove, the steps of mounting said work for bodily shiftable movement about a pivotal axis perpendicular to the plane of said surface, mounting said cutting element for rotation about an axis perpendicular to a plane tangent with the radially inner side of said groove and in a position to intersect the path of movement of said work upon oscillatory movement of said work about said pivotal axis, said cutting element having a peripheral cutting edge complementary in section to the cross-sectional configuration of the groove desired in the work, then rotating said cutting element and moving said work about said axis of movement thereof into cutting relationship with respect to said cutting element until the corresponding groove is formed, then shifting said work with respect to said cutting element so as to bring said cutting element into position to contact said work on a radius different from that employed for forming the first mentioned groove and rotating said cutting element and again effecting relative movement between said cutting element and work until another of said grooves has been formed, and repeating said shifting of said work and said relative movement between said cutting element and work until all of said grooves have been formed.

3. In the formation, by means of a rotating cutting element, of a multiplicity of concentric curved serrations in a flat surface of a piece of work by the formation of a plurality of curved grooves in said surface and in which each groove is provided with a radially inner side inclined away from such surface and from the work toward a perpendicular line passing through the center of curvature of the groove, the steps of mounting said work for bodily shiftable movement about a pivotal axis perpendicular to the plane of said surface, mounting a cutting element with its axis of rotation perpendicular to a plane tangent to the radially inner side of a groove to be formed thereby and for bodily movement in a direction parallel to said tangent plane, said cutting element having a cutting edge thereon in said tangent plane and a second cutting edge thereon at such an angle thereto that said cutting edges when viewed in section taken in a plane including the axis of rotation of said cutting element is complementary in shape and contour to the space desired to be provided between said serrations, rotating said cutting element and simultaneously moving said work about said axis of movement thereof and feeding said cutting element into operative engagement with respect to said work until a groove has been formed in said work by said cutting element, separating said cutting element and work by movement of said cutting element in the direction of said bodily shifting movement thereof, then shifting said work with respect to said cutting element so as to bring said cutting element into position to contact said work on a radius different from that employed for forming the first-mentioned groove and rotating said cutting element and again effecting relative movement between said cutting element and work until another of said grooves has been formed, and repeating said shifting of said work and said relative movement between said cutting element and work until all of said grooves have been formed.

JULIUS DUSEVOIR.